(12) United States Patent
Tanaka et al.

(10) Patent No.: US 9,556,380 B2
(45) Date of Patent: Jan. 31, 2017

(54) FLUORESCENT MATERIAL, SCINTILLATOR AND RADIATION CONVERSION PANEL

(71) Applicant: HITACHI METALS, LTD., Minato-ku, Tokyo (JP)

(72) Inventors: Kenya Tanaka, Osaka (JP); Ryouhei Nakamura, Osaka (JP)

(73) Assignee: Hitachi Metals, Ltd., Minato-ku (JP)

( * ) Notice: Subject to any disclaimer, the term of this patent is extended or adjusted under 35 U.S.C. 154(b) by 0 days.

(21) Appl. No.: 14/771,441

(22) PCT Filed: Apr. 10, 2014

(86) PCT No.: PCT/JP2014/060396
§ 371 (c)(1),
(2) Date: Aug. 28, 2015

(87) PCT Pub. No.: WO2014/168202
PCT Pub. Date: Oct. 16, 2014

(65) Prior Publication Data
US 2016/0017223 A1 Jan. 21, 2016

(30) Foreign Application Priority Data

Apr. 12, 2013 (JP) .................. 2013-083646

(51) Int. Cl.
*G01T 1/20* (2006.01)
*C09K 11/77* (2006.01)
*G21K 4/00* (2006.01)

(52) U.S. Cl.
CPC ........ *C09K 11/7774* (2013.01); *C09K 11/7792* (2013.01); *G21K 4/00* (2013.01); *G21K 2004/06* (2013.01)

(58) Field of Classification Search
CPC ........... G01T 1/20; G01T 1/202; G01T 1/2023
See application file for complete search history.

(56) References Cited

U.S. PATENT DOCUMENTS 6,669,866 B1* 12/2003 Kummer ............ C09K 11/7715
252/301.4 R
7,008,558 B2* 3/2006 Vartuli ............... C09K 11/7774
250/363.04

(Continued)

FOREIGN PATENT DOCUMENTS

CN 101084290 12/2007
EP 2 157 153 7/2009

(Continued)

OTHER PUBLICATIONS

International Search Report for PCT/JP2014/060396 Dated Jul. 15, 2014.

*Primary Examiner* — David Porta
*Assistant Examiner* — Djura Malevic
(74) *Attorney, Agent, or Firm* — Jeffrey L. Costellia; Nixon Peabody LLP

(57) ABSTRACT

A fluorescent material having a composition formula represented as $(Gd_{1-\alpha-\beta-\gamma}L_{\alpha}Ce_{\beta}Tb_{\gamma})_{3+a}(Al_{1-u-v}Ga_{u}Sc_{v})_{5-b}O_{12}$ (L is at least one element selected from Y and Lu), satisfying the following ranges: $0 \leq a \leq 0.1$, $0 \leq b \leq 0.1$, $0 \leq \alpha \leq 0.3$, $0.0003 \leq \beta \leq 0.005$, $0.02 \leq \gamma \leq 0.2$, $0.27 \leq u \leq 0.75$, and $0 \leq v \leq 0.02$. Preferably, $0 < a \leq 0.07$, $0 < b \leq 0.07$, $0 < \alpha \leq 0.15$, $0.0003 \leq \beta \leq 0.004$, $0.03 \leq \gamma \leq 0.15$, $0.35 \leq u \leq 0.70$, and $0 \leq v \leq 0.02$.

8 Claims, 5 Drawing Sheets

(56) References Cited

U.S. PATENT DOCUMENTS

| | | | | |
|---|---|---|---|---|
| 7,063,807 B2 * | 6/2006 | Kummer | ............ | C09K 11/7715 252/301.4 R |
| 7,094,362 B2 * | 8/2006 | Setlur | ................ | C09K 11/7774 252/301.4 F |
| 7,442,326 B2 * | 10/2008 | Setlur | ................ | C09K 11/7774 252/301.4 F |
| 2004/0173807 A1 * | 9/2004 | Tian | ................... | C09K 11/7774 257/98 |
| 2004/0218712 A1 | 11/2004 | Jiang et al. | | |
| 2005/0035294 A1 | 2/2005 | Leppert | | |
| 2005/0274895 A1 | 12/2005 | Jiang et al. | | |
| 2008/0017802 A1 | 1/2008 | Nakamura et al. | | |
| 2011/0006213 A1 | 1/2011 | Sato et al. | | |
| 2012/0018673 A1 * | 1/2012 | Raukas | .............. | C09K 11/7774 252/301.4 R |
| 2012/0145962 A1 | 6/2012 | Fukuta et al. | | |
| 2013/0043430 A1 | 2/2013 | Nakamura et al. | | |

FOREIGN PATENT DOCUMENTS

| | | |
|---|---|---|
| JP | 2004-333489 | 11/2004 |
| JP | 2005-54178 | 3/2005 |
| JP | 2005-350672 | 12/2005 |
| JP | 2011-17683 | 1/2011 |
| JP | 2012-72331 | 4/2012 |
| JP | 2012-184397 | 9/2012 |
| WO | WO 2012/057133 | 5/2012 |

* cited by examiner

FLUORESCENT MATERIAL, SCINTILLATOR AND RADIATION CONVERSION PANEL

TECHNICAL FIELD

The present invention relates to a fluorescent material, which is a garnet-type oxide having a composition including at least Gd, Al and Ga, a scintillator, and a radiation image conversion panel.

BACKGROUND ART

Radiation imaging systems for irradiating an object with radiation and imaging the radiation that has passed through the object have been widely used in dentistry, mammography and chest radiography apparatuses. For the radiation detector section, flat panel detectors (hereinafter referred to as "FPDs") capable of converting radiation directly into digital data have been realized. FPDs are rapidly becoming widespread as they are advantageous in that the image can be checked immediately, as compared with conventional schemes where imaging plates are used.

Typical FPDs include those of the direct conversion type which use amorphous Se to convert radiation directly into an electrical signal, and those of the indirect conversion type which once convert radiation into light by means of a scintillator such as CsI:Tl and $Gd_2O_2S$:Tb, and then convert the converted light into an electrical signal by means of a photodetector such as a CCD. The direct conversion type has a problem in that a large amount of noise components is contained in the image. Therefore, at present, the indirect conversion type is used more often.

The radiation image conversion panel of an FPD is composed of a plate-shaped photoelectric converter, and a plate-shaped scintillator disposed on the photoelectric converter, for example. This radiation conversion panel has a structure in which X rays having passed through the subject impinge on the scintillator, and light generated by the scintillator is guided from the X-ray irradiation side toward the photoelectric converter side. The scintillator has a structure in which a fluorescent material is provided in the form of a plurality of fibers (hereinafter "fibrous phosphors"), which are disposed in parallel to one another, so as to guide light toward the photoelectric converter.

Patent Document No. 1 proposes a radiation image conversion panel using a combination of columnar crystals and non-columnar crystals as the plate-shaped scintillator, where the difference in refractive index between the columnar crystals and gaps therebetween is utilized to reflect light inside the columnar crystals so as to guide light to the photoelectric converter.

Also, a structure is known in the art in which a fluorescent material made of an oxide or an oxysulfide is spun into fibrous phosphors, which are bundled together with an adhesive material (Patent Document Nos. 2 and 3).

CITATION LIST

Patent Literature

[Patent Document No. 1] Japanese Laid-Open Patent Publication No. 2011-17683
[Patent Document No. 2] Japanese Laid-Open Patent Publication No. 2004-333489
[Patent Document No. 3] Japanese Laid-Open Patent Publication No. 2005-54178

SUMMARY OF INVENTION

FPDs of the indirect conversion type require fluorescent materials for use in the scintillator that have a high light output even for a small amount of radiation so as to minimize the exposure to radiation and to obtain high-resolution images. They also require those of which the afterglow at some tens of ms after stopping the X-ray irradiation is as small as 0.1% or less.

Technical Problem

The radiation image conversion panel using columnar crystals of Patent Document No. 1 uses, as a plate-shaped scintillator, CsI:Tl which is crystal-grown into a columnar shape by a vapor deposition method. However, the afterglow at 20 milliseconds (20 ms) after stopping the X-ray irradiation is large, and it is difficult to obtain a scintillator whose afterglow is 0.1% or less, as required in recording a movie, particularly. Other problems include the use of Ti, which is a toxic substance, the high deliquescence and the resulting difficulty of handling, and the significant radiation deterioration.

The fluorescent material of Patent Document No. 2, which is a garnet-type oxide of $(LuTbCe)_3Al_5O_{12}$, has a low light output, and it is only possible to obtain those of which the light output is 70% at best, 100% being that of $Gd_2O_2S$:Tb.

While Patent Document No. 3 describes a fluorescent material made of $(MLn)_2O_2S$ (M in the formula is at least element selected from the group of Y, La, Sc, Lu and/or Gd, and Ln is at least element selected from the group of Eu, Ce, Pr, Tb, Yb, Dy, Sm and/or Ho) including $Gd_2O_2S$:Tb, there is a demand for fluorescent materials having higher light outputs.

An object of the present invention is to provide a fluorescent material having a high light output and a sufficiently small afterglow. It is also an object of the present invention to provide a scintillator and a radiation image conversion panel using such a fluorescent material.

Solution to Problem

A fluorescent material of the present invention has a composition formula represented as $(Gd_{1-\alpha-\beta-\gamma}L_\alpha Ce_\beta Tb_\gamma)_{3+a}(Al_{1-u-v}Ga_u Sc_v)_{5-b}O_{12}$ (L is at least one element selected from Y and Lu), where a, b, α, β, γ, u and v satisfy $0 \leq a \leq 0.1$, $0 \leq b \leq 0.1$, $0 \leq \alpha \leq 0.3$, $0.0003 \leq \beta \leq 0.005$, $0.02 \leq \gamma \leq 0.2$, $0.27 \leq u \leq 0.75$, and $0 \leq v \leq 0.02$.

Preferably, a, b, α, β, γ, u and v satisfy $0 < a \leq 0.7$, $0 < b \leq 0.7$, $0 < \alpha \leq 0.15$, $0.0003 \leq \beta \leq 0.004$, $0.03 \leq \gamma \leq 0.15$, $0.35 \leq u \leq 0.70$, and $0 \leq v \leq 0.02$. More preferably, β satisfies $0.0005 \leq \beta \leq 0.003$.

Preferably, v satisfies $0.003 \leq v \leq 0.02$.

Preferably, a=b.

The fluorescent material may be a polycrystalline material, and an average crystal grain size of the sintered material is 0.05 μm or more and 5 μm or less.

The average fiber diameter of the fluorescent material is 1 μm or more and 50 μm or less.

A scintillator of the present invention includes fluorescent materials set forth above and having a plate shape, wherein the fluorescent materials are disposed in parallel to one another so that a longitudinal direction of a fibrous shape of the fluorescent materials is along a thickness direction of the plate shape.

A radiation image conversion panel of the present invention includes: a scintillator set forth above; and a photoelectric converter for converting light into an electrical signal.

Advantageous Effects of Invention

According to the present invention, it is possible to provide a fluorescent material having a high light output and a sufficient small afterglow.

According to the fluorescent material of the present invention, it is possible to obtain a fluorescent material that is hardly broken even when it is provided in a fibrous form.

DESCRIPTION OF EMBODIMENTS

Figure 1:
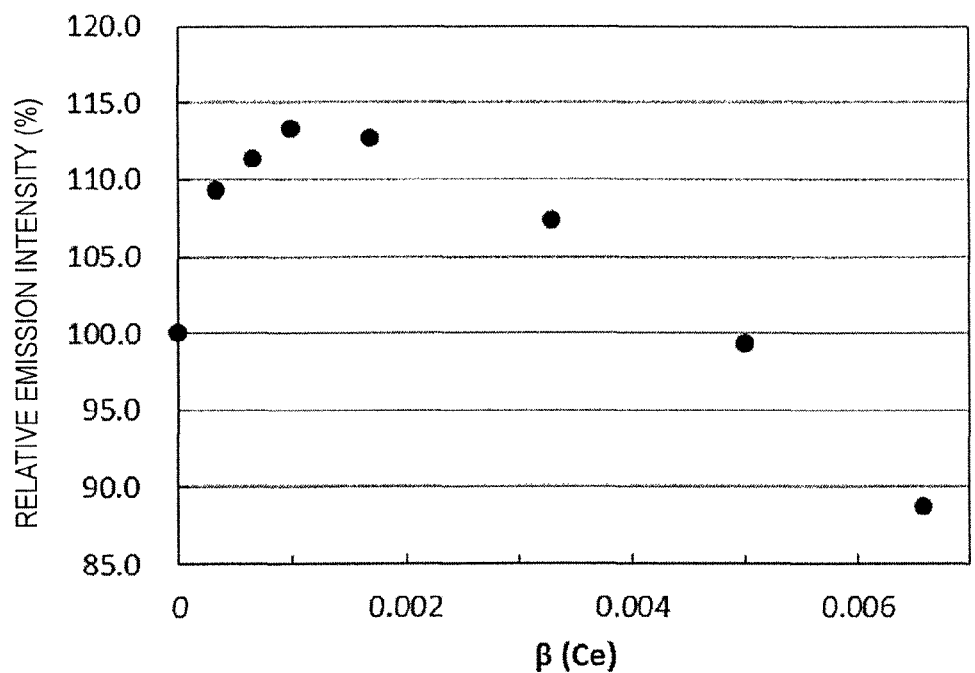
FIG. 1 A graph showing a relationship between the amount β of Ce and the relative light output.

The present invention is a fluorescent material having a composition represented by $(Gd_{1-\alpha-\beta-\gamma}L_\alpha Ce_\beta Tb_\gamma)_{3+a}(Al_{1-u-v}Ga_u Sc_v)_{5-b}O_{12}$ (L is at least one element selected from Y and Lu). Here, a, b, α, β, γ, u and v satisfy the following relationships:

$0 \leq a \leq 0.1$, $0 \leq b \leq 0.1$, $0 \leq \alpha \leq 0.3$, $0.0003 \leq \beta \leq 0.005$, $0.02 \leq \gamma \leq 0.2$, $0.27 \leq u \leq 0.75$, $0 \leq v \leq 0.02$.

A fluorescent material made of a garnet-type oxide is a metal oxide that is stable against radiation, and is known to be a fluorescent material having a high light output. The light emission of a fluorescent material occurs as electrons and holes generated by the x-ray excitation combine together in the light-emitting ion. With a garnet-type oxide including Gd, Al and Ga, the light output is improved by adding Ce and Tb as the light-emitting ion, as compared with a case where Ce or Tb is used alone in the composition. Where only one of Ce and Tb is added, although the light output increases up to a certain amount of addition, when the addition becomes excessive, concentration quenching occurs, thereby lowering the light output. The present invention realizes a fluorescent material having a high light output by using a garnet-type oxide having a composition including Gd, Al and Ga as the base metal, and by co-adding slight amounts of both light-emitting elements of Ce and Tb. As compared with a conventional fluorescent material made of CsI with Tl added thereto, the afterglow is sufficiently small.

The value β representing the amount of Ce is set in the range $0.0003 \leq \beta \leq 0.005$. Where β is less than 0.0003, there are too few Ce atoms, as a light-emitting element, and it is therefore not possible to efficiently convert the absorbed energy of the X rays into light energy. Where β is greater than 0.005, the distance between Ce atoms is too small, and there occurs migration of energy (so called "concentration quenching"), thereby lowering the light output. In order to realize a particularly high light output, it is preferred that β is set in the range of $0.0003 \leq \beta \leq 0.004$. More preferably, $0.0005 \leq \beta \leq 0.003$.

Similarly, the value γ representing the amount of Tb is set in the range of $0.02 \leq \gamma \leq 0.2$. Where γ is less than 0.02, there are too few Tb atoms, as a light-emitting element, and it is therefore not possible to efficiently convert the absorbed energy of the X rays into light energy. Where γ is greater than 0.2, the distance between Tb atoms is too small, and there occurs migration of energy (so called "concentration quenching"), thereby lowering the light output. In order to realize a particularly high light output, it is more preferred that γ is set in the range of $0.03 \leq \gamma \leq 0.15$. Even more preferably, $0.03 \leq \gamma \leq 0.1$.

According to an in-depth study by the present inventors, where Ce or Tb is added alone to a garnet-type oxide including Gd, Al and Ga, the fluorescence intensity increases as the amount of addition of Ce or Tb increases up to a ratio of β=0.001 or γ=0.05, and the light output rather decreases when the amount of addition increases past these values. In such a case, however, it was found that the light output can be further increased by adding both of Tb and Ce. It is believed that this is because the electron transition state for producing fluorescent light differs between Tb and Ce (4f-4f electron transition for Tb, and 4f-5d transition for Ce), and it is therefore possible to efficiently combine together electrons and holes generated by the x-ray excitation by co-adding light-emitting elements of different transition energies.

The amounts by which other elements are added will now be described.

The ranges of a and b are both $0 \leq a \leq 0.1$ and $0 \leq b \leq 0.1$.

Although a and b are preferably of the same value, they may take different values due to solid solution of an impurity element such as Si and Fe contained in raw materials or due to a weighing error. Where a≠b, oxygen defects easily occur in the crystal, and the light output may decrease.

If a is a negative number less than 0, ion vacancies are produced in sites occupied by rare-earth elements $(Gd_{1-\alpha-\beta-\gamma}L_\alpha Ce_\beta Tb_\gamma)$, thereby increasing the afterglow. Moreover, the light output will be extremely low. Therefore, a is set to 0 or more. For mass production, it is preferred that 0<a, 0<b, $0.0001 \leq a$, and $0.0001 \leq b$, taking composition variations into consideration. Note however that if a or b exceeds 0.1, an impurity phase (perovskite phase $GdAlO_3$), which is not the garnet type, is likely to be generated. The impurity phase has a different refractive index than the garnet-type phase of the base metal, and therefore causes light scattering, thereby lowering the light output.

In order to realize both a particularly high light output and a low afterglow characteristic, a and b are preferably in the ranges of 0<a≤0.07 and 0<b≤0.07, and particularly preferably in the ranges of 0.0001≤a≤0.05 and 0.0001≤b≤0.05.

The value α representing the amount of the L element (Y and/or Lu) is set to 0≤α≤0.3.

By replacing Gd with L, whose ionic radius is small, it is possible to reduce deposition of the impurity phase (perovskite phase $GdAlO_3$), and to suppress the decrease in light output. If L exceeds 0.3, the bandgap increases, thereby lowering the light output. In order to realize a particularly high light output, α is more preferably set in the range of 0<α≤0.15.

The value u representing the amount of Ga is set to 0.27≤u≤0.75.

If u is less than 0.27, the perovskite phase occurs, thereby lowering the light output. It also lowers the sintering property. For example, if u≤0.2, the sintering property lowers, thereby increasing voids. On the other hand, if u exceeds 0.75, the light output lowers, thereby significantly increasing the afterglow. In order to realize a particularly high relative light output, u is preferably set in the range of 0.35≤u≤0.70, and is more preferably set in the range of 0.4≤u≤0.6.

The value v representing the amount of Sc is set to 0≤v≤0.02.

Sc is an additive element for improving the light output and reducing the afterglow.

Ga is an ion having a valence of +3, but is predisposed to change its valence to +1. If the valence of Ga becomes +1 in the garnet-type structure, the light output lowers and the afterglow increases. It is believed that $Sc^{3+}$ has a larger ionic radius than those of $Al^{3+}$ and $Ga^{3+}$, and thereby suppresses the valence of $Ga^{3+}$ from changing. In order to realize a particularly high relative light output ratio, v is preferably set in the range of 0≤v≤0.02.

By adding Sc, it is possible to increase the mechanical strength (particularly, the fracture toughness) of the fluorescent material, and this is suitable for obtaining a fibrous fluorescent material. This is because the addition of Sc suppresses the crystal grain growth when sintering the fluorescent material.

For example, when manufacturing a fluorescent material made of a polycrystalline material, by adding Sc, the sintered fluorescent material will have densely-packed minute crystals therein. Typically, with a polycrystalline ceramic, even if a fracture occurs at some position therein, the extension of the crack caused by the fracture is stopped by crystal grains with a high probability. Therefore, more minute crystals have a higher fracture toughness, and the mechanical strength also increases as a result. A fluorescent material is also a ceramic, and has similar tendencies.

The average crystal grain size of the sintered material is preferably 0.05 μm or more and 5 μm or less. If it is 0.05 μm or more, the crystal grain size can be easily controlled with Sc. If it is 5 μm or less, the effect of increasing the mechanical strength is sufficiently realized. The average crystal grain size is preferably 0.1 μm or more and 2 μm or less.

If the value v representing the amount of Sc is 0.003 or more, the average crystal grain size of the fluorescent material can be decreased down to 5 μm or less. If v is 0.02 or less, the light output can be made generally equal to or greater than that of the fluorescent material of $Gd_2O_2S$:Tb.

Note that if v is 0.015 or more, it is possible to manufacture a fluorescent material whose average grain size is 2 μm or less.

The fluorescent material of the present invention does not include sulfur. Therefore, as sulfide is not used as a material, as opposed to a $Gd_2O_2S$-based fluorescent material, it is possible to obtain a sintered material having a high density, which increases the transmittance and makes it possible to realize a high light output.

Note that in the composition formula of the fluorescent material of the present invention, the oxygen composition ratio is defined to be 12. This is because the composition ratio is defined based on oxygen, assuming that the fluorescent material of the present invention has a garnet structure. However, the fluorescent material of the present invention does not need to have a complete garnet structure. As described above, depending on the values of a and b, the fluorescent material of the present invention may have a garnet structure with oxygen deficiency or oxygen excess. That is, irrespective of whether there is oxygen deficiency or oxygen excess, the composition ratios a, b, α, β, γ, u and v in the composition formula only need to satisfy the relationship described above, where the composition formula is defined assuming that the oxygen composition ratio is 12.

Example methods for manufacturing a fluorescent material will be described below, but the present invention is not limited thereto.

<Inorganic Salt Method>

The inorganic salt method is a method in which a precursor, obtained by dissolving a material with an acid, is dried and sintered.

For example, gadolinium nitrate, yttrium nitrate or lutetium nitrate, cerium nitrate, terbium nitrate, aluminum nitrate, gallium nitrate, scandium nitrate, and the like, having been weighed to a target composition, are dissolved in pure water to obtain a precursor solution as a material. Alternatively, the starting materials may all be an acetate, a formate, a lactate, or the like, or a combination thereof. An oxide material may be dissolved in a nitric acid aqueous solution or a hydrochloric acid aqueous solution. Moreover, a citric acid can be added, and it can be stirred while heating it to 60° C. to 80° C. so as to increase the viscosity through polymerization. In the process, a small amount of polyvinyl alcohol, polyvinylpyrrolidone, or the like, may be added for adjusting the viscosity. Thus, it is possible to obtain a gel precursor adjusted to a viscosity that is suitable for shaping.

This precursor may be shaped into a sheet shape by a doctor blade method, or the like, whereas when spinning the precursor, the precursor is spun into a fiber of a predetermined diameter through a nozzle, or the like.

This fiber is dried at about 100° C. to 150° C., and then sintered in oxygen at 1100° C. to 1500° C. for 0.5 to 5.0 hours.

With the manufacturing method described above, there is obtained a fluorescent material of a garnet-type oxide.

As compared with the slurry method or the dispersed kneading method to be described later, the inorganic salt method is preferable when making the fluorescent material fibrous because it is easy to control the fiber diameter, the cross-sectional shape and the density.

<Slurry Method>

The slurry method is a method in which a material provided as a slurry is mixed with a binder, and then dried and sintered.

For example, a fine powder of an oxide material having an average grain size of 1 μm or less, obtained by appropriately weighing gadolinium oxide, yttrium oxide, lutetium oxide, cerium oxide, terbium oxide, aluminum oxide, gallium oxide and scandium oxide to a target composition, is subjected to wet ball mill using alumina balls, thereby producing a slurry as a material. A nitrate, or the like, may be used of substances to be used in small amounts such as cerium and terbium which are light-emitting ions. A citric acid and polyvinylpyrrolidone as a binder are added to the produced slurry, and the mixture is stirred while being heated to 100° C. to make it into a slurry before it is shaped. Using this slurry, it is possible to obtain a sheet-shaped material. When spinning the material, the slurry is spun into a fiber of a predetermined diameter through a nozzle, or the like. This fiber is dried at about 100° C. to 150° C., and then sintered in oxygen at 1100° C. to 1500° C. for 0.5 to 5.0 hours.

With the manufacturing method described above, there is obtained a fluorescent material of a garnet-type oxide.

<Dispersed Kneading Method>

The dispersed kneading method is a manufacturing method in which a fluorescent material in a powder form is dispersed in an adhesive material to be solidified.

For example, a fine powder of an oxide material having a grain size f 1 μm or less, obtained by appropriately weighing gadolinium oxide, yttrium oxide, lutetium oxide, cerium oxide, terbium oxide, aluminum oxide, gallium oxide and scandium oxide to a target composition, is subjected to wet ball mill using alumina balls, thereby producing a slurry as a material.

The produced slurry is dried, and then sintered in oxygen, thereby obtaining a fluorescent material in a powder form.

The fluorescent material in a powder form is kneaded with an adhesive material such as a resin or a glass, and shaped into a sheet or spun into a fibrous form as necessary, to be solidified to obtain a phosphor.

Also with the dispersed kneading method, addition of Sc suppresses the grain growth of the powder, thereby reducing the average grain size of the obtained fluorescent material in a powder form. Where the average grain size of the powder is small, when manufacturing a phosphor by mixing a resin with the powder and solidifying the powder, it is possible to mitigate the stress localization inside the phosphor, and the mechanical strength will be high as a result.

The average grain size of the powder is preferably 0.05 μm or more and 5 μm or less, and more preferably 0.1 μm or more and 2 μm or less. If it is 0.05 μm or more, the crystal grain size can be easily controlled with Sc. If it is 5 μm or less, the effect of increasing the mechanical strength of the fibrous phosphor is sufficiently realized.

If the value v representing the amount of Sc is 0.003 or more, the average grain size of the fluorescent material in a powder form can be decreased down to less than 5 μm. Note however that if v exceeds 0.02, the light output decreases.

Where a fibrous phosphor is produced from the fluorescent material of the present invention, since the fluorescent material is compact with a high density, there is no need to use a sintering method such as HIP (hot isostatic pressing method), as opposed to a $Gd_2O_2S$-based fluorescent material. Therefore, it is possible to reduce the cost of manufacturing a fibrous phosphor.

[Scintillator]

The fluorescent material described above can be used as a scintillator. It can be used as a plate-shaped scintillator or a powder scintillator. A plurality of fluorescent materials can be used in combination as a scintillator, and it is possible for example to obtain a scintillator having fibrous phosphors disposed in parallel to one another.

For example, a scintillator having fibrous phosphors disposed in parallel to one another is used in an FPD. In order to realize a high resolution, a fibrous phosphor is obtained by spinning the fluorescent material described above into as thin threads as possible. Using a thin fibrous phosphor, it is possible to increase the number of fibrous phosphors that can be disposed per unit area, thereby improving the detection resolution of the FPD.

However, the thinner the fibrous phosphor is, the easier it is for it to bend, making handling difficult. For example, when producing a plate-shaped scintillator, fibrous phosphors need to be bound together and cured with an adhesive material, in which process the fibrous phosphor may bend and break. While a fibrous phosphor having a high mechanical strength is required for such reasons, it is possible to obtain a fibrous phosphor that is thin but has a high mechanical strength by adding Sc thereto as described above.

When the average fiber diameter is less than 1 μm, the mechanical strength will be insufficient, and it is likely to break. Where fibrous phosphors are disposed in parallel to obtain a scintillator for an FPD, the packing density of the fiber is unlikely to increase. On the other hand, when the average fiber diameter exceeds 50 μm, the resolution will lower as a scintillator for an FPD.

The average fiber diameter is more preferably 2 μm or more and 30 μm or less, and even more preferably 3 μm or more and 15 μm or less, in which case the packing density is likely to increase and the fiber is unlikely to fracture.

Where fibrous phosphors are disposed in parallel to one another, it is preferred that a resin (hereinafter, "a binder resin") is used. This resin is selected such that the resin has a large refractive index difference from the fluorescent material so as to guide the light emitted inside the fluorescent material to a photoelectric converter to be described later. Since the refractive index of a polycrystal fluorescent material using the fluorescent material of the present invention can be made 1.80 or more and 2.00 or less, it is preferred to use a binder resin whose refractive index is 1.50 or less, which may be an epoxy-based, fluorine-based or silicon-based resin, for example.

The binder resin preferably has a viscosity of 50 mPa·s or more and 1000 mPa·s or less. With a viscosity less than 50 mPa·s, most of the resin will be discharged by the pressurizing force used for binding, thereby lowering the adhesive capacity. With a viscosity greater than 1000 mPa·s, it is difficult to uniformly fill the resin into fiber gaps.

The binder resin preferably has a small radiation deterioration (no discoloration or embrittlement) against X rays. From these points of view, the thermosetting resin is most preferably an epoxy-based resin.

When the fibrous phosphor is manufactured by the dispersed kneading method, the adhesive material used for spinning preferably has a refractive index of 1.65 or more, and may be polyethylene terephthalate, for example.

[Radiation Image Conversion Panel]

By combining a scintillator with a photoelectric converter for converting light into an electrical signal, it is possible to produce a radiation image conversion panel having a high sensitivity, a high resolution, and a small radiation deterioration.

Figure 9:
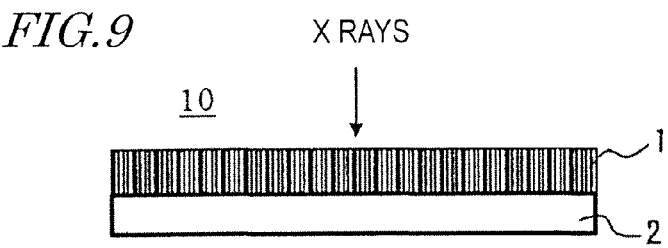
FIG. 9 A schematic diagram showing an example radiation image conversion panel according to an example.

FIG. 9 is a schematic diagram showing a radiation image conversion panel 10 according to an embodiment of the present invention. As shown in FIG. 9, the radiation image conversion panel 10 of the present invention is composed of a plate-shaped scintillator 1, and a photoelectric converter 2. For example, the photoelectric converter 2 includes a plurality of photodiodes disposed in a two-dimensional arrangement. The photodiode may be a silicon photodiode, for example.

Figure 10:
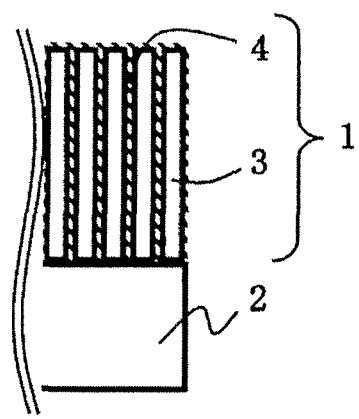
FIG. 10 A partial enlarged view of FIG. 9.

FIG. 10 is a partial enlarged view of FIG. 9. The plate-shaped scintillator includes fibrous phosphors 3 disposed in parallel to one another so that the longitudinal direction thereof is parallel to the plate thickness direction. The gaps (hatched portions) between the fibrous phosphor 3 (the average fiber diameter is 1 to 50 μm, the length is 0.5 to 1.5 mm) are filled with a binder resin 4, and the fibrous phosphors 3 are aligned so that they are parallel to the direction in which radiation enters and so as to realize a generally uniform density. Light emitted as a result of the fibrous phosphor 3 absorbing X rays is guided to the photoelectric converter 2 while being reflected due to the refractive index difference between the fibrous phosphor 3 and the binder resin 4 without being scattered out of the fibrous phosphor 3, thereby suppressing diffusion of the light and realizing an increased resolution of the detected image.

Example 1

The relationship between the amount of Ce and the amount of Tb and the relative light output was examined.

The light emission of the scintillator occurs as electrons and holes generated by the x-ray excitation combine together in the light-emitting ion. For the composition type of the present invention, light-emitting ions include two elements, i.e., Ce and Tb.

The relationship between the amount $\beta$ of Ce and the relative light output is as follows. Gadolinium oxide, yttrium oxide, terbium oxide, cerium nitrate (this may be cerium oxide; this similarly applies to examples below), aluminum oxide, gallium oxide and scandium oxide were weighed to a composition formula shown in Table 1. In the process, the amount $\beta$ of Ce was varied between 0, 0.00033, 0.00066, 0.0010, 0.0017, 0.0033, 0.0050 and 0.0066 in the composition formula below. These material powders were each put in a resin-made pot and subjected to wet ball mill using alumina balls for 40 hours, thereby producing a material slurry. The produced slurry was dried and then press-shaped into a flat-plate shape, which was sintered in oxygen. The sintering was performed by holding it at 1660° C. for 12 hours. The obtained fluorescent materials were subjected to an ICP-AES analysis (a high-frequency inductively-coupled plasma emission spectroscopy from Perkin Elmer: OPTIMA-3300XL) for identifying the composition thereof, to find that they were fluorescent materials having the composition shown in Table 1. The average crystal grain size was about 3 μm.

The relationship between the amount $\beta$ of Ce and the relative light output is shown in FIG. 1.

TABLE 1

| Composition (atomic ratio) of $(Gd_{1-\alpha-\beta-\gamma}L_\alpha Ce_\beta Tb_\gamma)_{3+a}(Al_{1-u-v}Ga_u Sc_v)_{5-b}O_{12}$ | | | | | |
|---|---|---|---|---|---|
| a, b | α (Y) | β (Ce) | γ (Tb) | u (Ga) | v (Sc) |
| 0.01 | 0.033 | 0~0.0066 | 0.05 | 0.393 | 0.006 |

The relative light output of FIG. 1 is a value (%), 100% being the light output of $Gd_2O_2S$:Tb. The light output was measured by using a silicon photodiode (S2281 from Hamamatsu Photonics). The light output was measured similarly for the subsequent examples.

As can be seen from FIG. 1, relative light outputs higher than 100% were realized when the value $\beta$ was in the range of $0.0003 \le \beta \le 0.005$. Since Ce improves the light output even in slight amounts, it is possible to sufficiently increase the light output if $\beta$ is 0.0003 or more. Relative light outputs of 105% or more were realized when the value $\beta$ was in the range of 0.00033~0.004, and relative light outputs of 110% or more were realized when it was in the range of $0.0005 \le \beta \le 0.003$.

The relationship between the amount γ of Tb and the relative light output is as follows. Gadolinium oxide, yttrium oxide, terbium oxide, cerium nitrate, aluminum oxide, gallium oxide and scandium oxide were weighed to a composition formula shown in Table 2. In the process, the amount γ of Tb was varied between 0, 0.01, 0.017, 0.033, 0.05, 0.066, 0.10, 0.13 and 0.20 in the composition formula below. These material powders were each put in a resin-made pot and subjected to wet ball mill using alumina balls for 40 hours, thereby producing a material slurry. The produced slurry was dried and then press-shaped into a flat-plate shape, which was sintered in oxygen. The sintering was performed by holding it at 1660° C. for 12 hours. The obtained fluorescent materials were subjected to an ICP-AES analysis for identifying the composition thereof, to find that they were fluorescent materials having the composition shown in Table 2. The average crystal grain size was about 3 μm.

Figure 2:
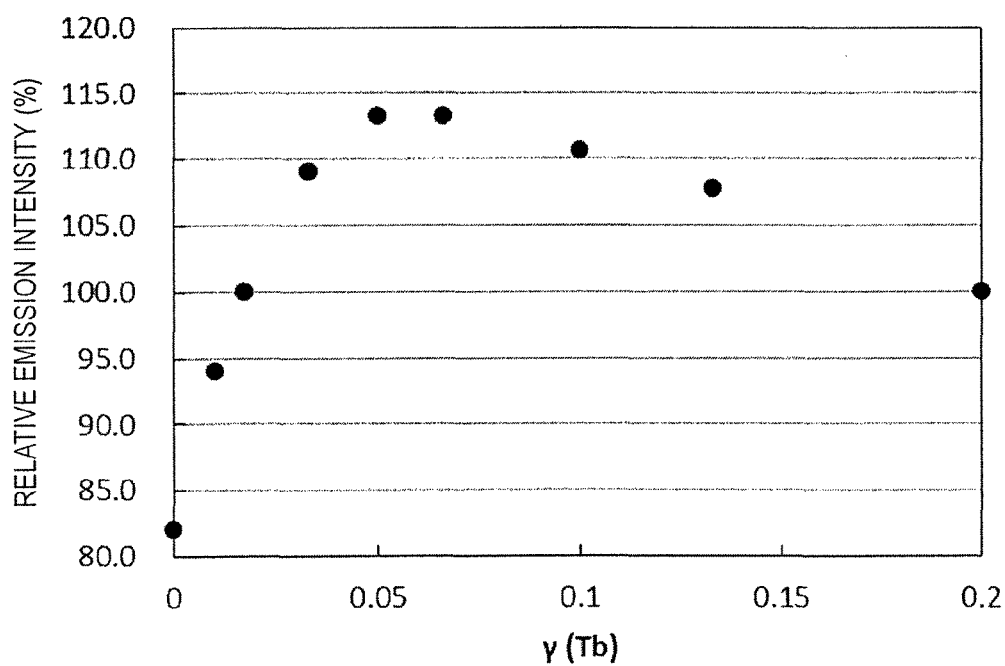
FIG. 2 A graph showing a relationship between the amount γ of Tb and the relative light output.

The relationship between the amount γ of Tb and the relative light output is shown in FIG. 2.

TABLE 2

| Composition (atomic ratio) of $(Gd_{1-\alpha-\beta-\gamma}L_\alpha Ce_\beta Tb_\gamma)_{3+a}(Al_{1-u-v}Ga_u Sc_v)_{5-b}O_{12}$ | | | | | |
|---|---|---|---|---|---|
| a, b | α (Y) | β (Ce) | γ (Tb) | u (Ga) | v (Sc) |
| 0.01 | 0.033 | 0.001 | 0~0.20 | 0.393 | 0.006 |

Those having sufficiently high light outputs were realized when the value γ was in the range of $0.02 \le \gamma \le 0.2$. The light output can be further increased by setting the value γ in the range of $0.03 \le \gamma \le 0.15$.

As shown in Table 2, FIG. 2 shows the results for a case where the amount β by which Ce is added is 0.001, and as can be seen from FIG. 1, the light output of the fluorescent material is maximized for Ce when the amount β by which Ce is added is 0.001. Therefore, FIG. 2 indicates that where Ce is contained under such a condition that the light output is maximized, it is still possible to further increase the light output by adding Tb, and the light output is maximized when the amount γ by which Tb is added is about 0.05.

Similarly, FIG. 1 shows the results for a case where the amount γ by which Tb is added is 0.05. Therefore, FIG. 1 indicates that where Tb is contained under such a condition that the light output is maximized, it is still possible to further increase the light output by adding Ce, and the light output is maximized when the amount β by which Ce is added is about 0.001.

From these results, it can be seen that as compared with a case where Ce and Tb are solely added to the fluorescent material, the total amount of Ce and Tb added can be increased, thereby realizing an even higher light output as compared with a case where Ce and Tb are solely added to fluorescent material.

Example 2

The relationship between the amount of Y and the relative light output was examined. Gadolinium oxide, yttrium oxide, terbium oxide, cerium nitrate, aluminum oxide, gallium oxide and scandium oxide were weighed to a composition formula shown in Table 3. In the process, the amount α of Y was varied between 0, 0.033, 0.10, 0.20, 0.30 and 0.40 in the composition formula below. These material powders were each put in a resin-made pot and subjected to wet ball mill using alumina balls for 40 hours, thereby producing a material slurry. The produced slurry was dried and then press-shaped into a flat-plate shape, which was sintered in oxygen. The sintering was performed by holding it at 1660° C. for 12 hours. The obtained fluorescent materials were subjected to an ICP-AES analysis for identifying the composition thereof, to find that they were fluorescent materials having the composition shown in Table 3. The average crystal grain size was about 3 µm.

Figure 3:
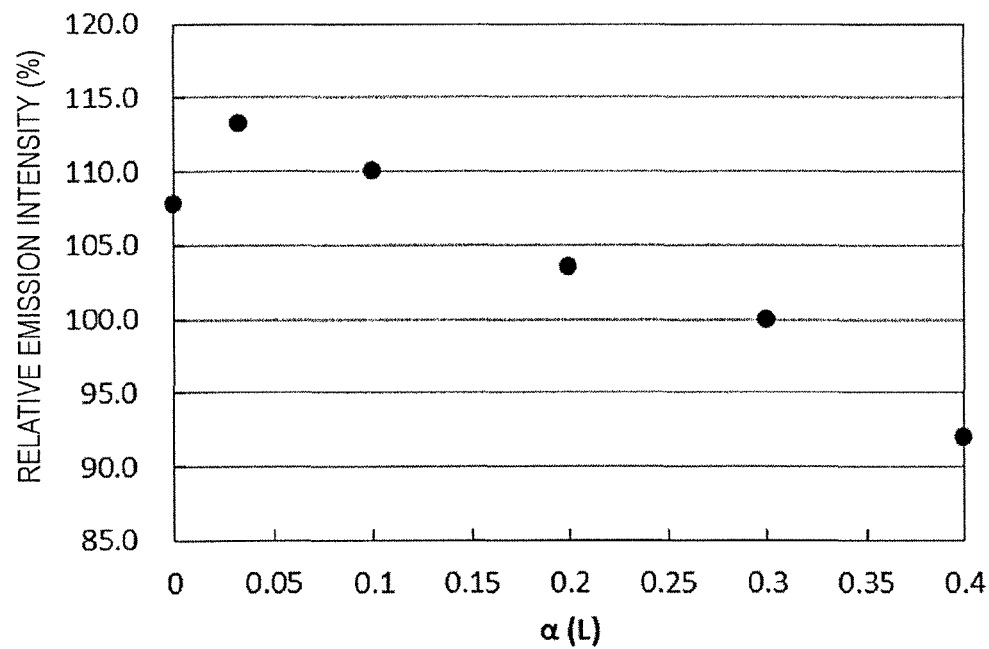
FIG. 3 A graph showing a relationship between the amount f of L element and the relative light output.

The relationship between the amount of Y and the relative light output is shown in FIG. 3.

TABLE 3

| Composition (atomic ratio) of $(Gd_{1-\alpha-\beta-\gamma}L_\alpha Ce_\beta Tb_\gamma)_{3+a}(Al_{1-u-v}Ga_u Sc_v)_{5-b}O_{12}$ | | | | | |
|---|---|---|---|---|---|
| a, b | α (Y) | β (Ce) | γ (Tb) | u (Ga) | v (Sc) |
| 0.01 | 0–0.40 | 0.001 | 0.05 | 0.393 | 0.006 |

The lowering of the light output can be prevented if the value α representing the amount of Y is $0 \leq \alpha \leq 0.3$. It is possible to further increase the light output by setting the value α so that $0 < \alpha \leq 0.15$. As can be seen from FIG. 3, the light output tends to lower when α is greater than 0.3. It is believed that this is because as the Y content increases, the bandgap becomes bigger, thereby reducing the production of electron-hole pairs by X-ray irradiation.

Example 3

The relationship between the amount of Ga and the relative light output was examined. Gadolinium oxide, yttrium oxide, terbium oxide, cerium nitrate, aluminum oxide, gallium oxide and scandium oxide were weighed to a composition formula shown in Table 4. In the process, the amount u of Ga was varied between 0.232, 0.293, 0.333, 0.373, 0.413, 0.453, 0.493, 0.573, 0.593, 0.693, 0.754 and 0.794 in the composition formula below. These material powders were each put in a resin-made pot and subjected to wet ball mill using alumina balls for 40 hours, thereby producing a material slurry. The produced slurry was dried and then press-shaped into a flat-plate shape, which was sintered in oxygen. The sintering was performed by holding it at 1660° C. for 12 hours. The obtained fluorescent materials were subjected to an ICP-AES analysis for identifying the composition thereof, to find that they were fluorescent materials having the composition shown in Table 4. The average crystal grain size was about 3 µm.

Figure 4:
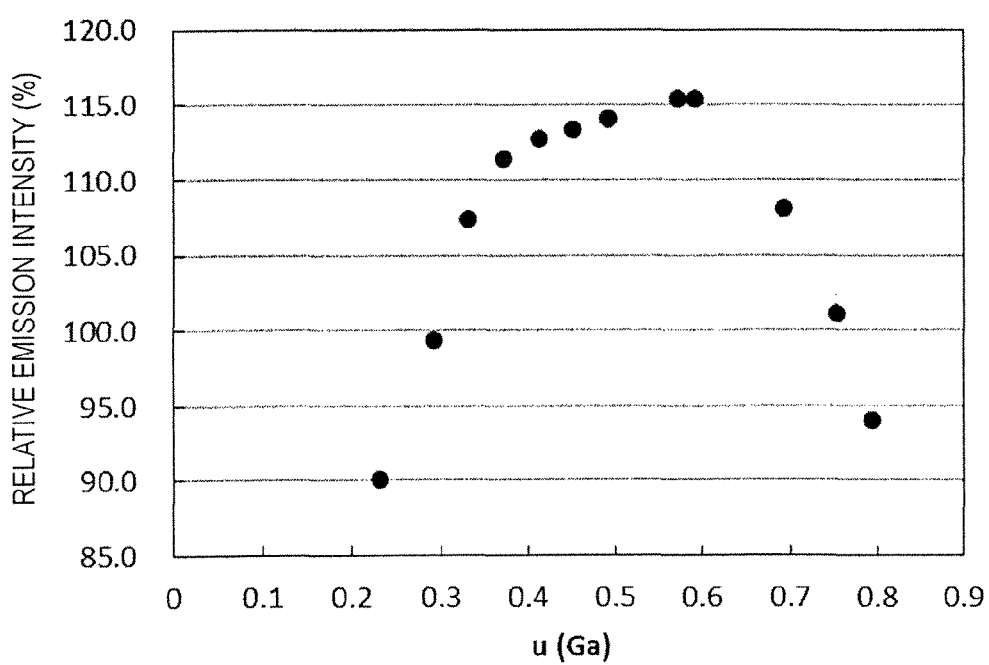
FIG. 4 A graph showing a relationship between the amount u of Ga and the relative light output.

The relationship between the amount of Ga and the relative light output is shown in FIG. 4.

TABLE 4

| Composition (atomic ratio) of $(Gd_{1-\alpha-\beta-\gamma}L_\alpha Ce_\beta Tb_\gamma)_{3+a}(Al_{1-u-v}Ga_u Sc_v)_{5-b}O_{12}$ | | | | | |
|---|---|---|---|---|---|
| a, b | α (Y) | β (Ce) | γ (Tb) | u (Ga) | v (Sc) |
| 0.01 | 0.033 | 0.001 | 0.05 | 0.232–0.794 | 0.006 |

As can be seen from the figure, the lowering of the relative light output can be prevented if the value u representing the amount of Ga is in the range of $0.27 \leq u \leq 0.75$, and a high light output can be realized if it is in the range of $0.35 \leq u \leq 0.70$. Particularly, if u satisfies $0.4 \leq u \leq 6$, it is possible to realize an even higher light output.

Example 4

The relationship between the value of a and b in the composition $(Gd_{1-\alpha-\beta-\gamma}Y_\alpha Ce_\beta Tb_\gamma)_{3+a}(Al_{1-u-v}Ga_u Sc_v)_{5-b}O_{12}$ and the relative light output was examined. Note that a and b were set to the same value. Gadolinium oxide, yttrium oxide, terbium oxide, cerium nitrate, aluminum oxide, gallium oxide and scandium oxide were weighed to a composition formula shown in Table 5. In the process, a and b were varied between −0.01, 0, 0.01, 0.02, 0.05, 0.1, 0.15 and 0.20 in the composition formula below. These material powders were each put in a resin-made pot and subjected to wet ball mill using alumina balls for 40 hours, thereby producing a material slurry. The produced slurry was dried and then press-shaped into a flat-plate shape, which was sintered in oxygen. The sintering was performed by holding it at 1660° C. for 12 hours. The obtained fluorescent materials were subjected to an ICP-AES analysis for identifying the composition thereof, to find that they were fluorescent materials having the composition shown in Table 5. The average crystal grain size was about 3 µm.

Figure 5:
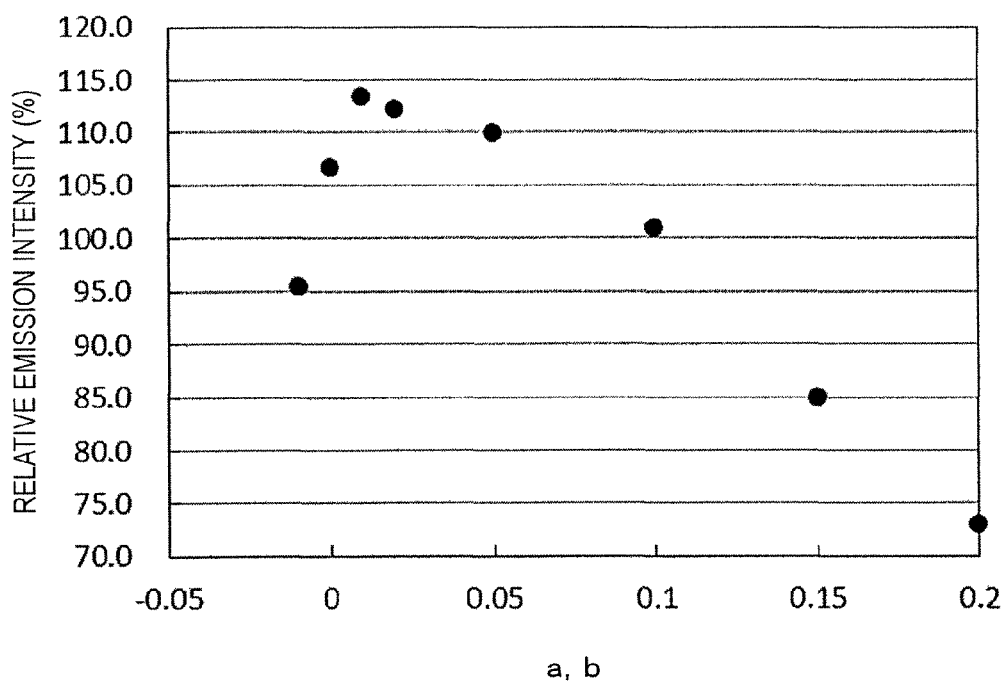
FIG. 5 A graph showing a relationship between the amount of a in the composition $(Gd_{1-\alpha-\beta-\gamma}L_\alpha Ce_\beta Tb_\gamma)_{3+a}(Al_{1-u-v}Ga_u Sc_v)_{5-b}O_{12}$ and the relative light output.

The relationship between the value a and the relative light output is shown in FIG. 5.

TABLE 5

| Composition (atomic ratio) of $(Gd_{1-\alpha-\beta-\gamma}L_\alpha Ce_\beta Tb_\gamma)_{3+a}(Al_{1-u-v}Ga_u Sc_v)_{5-b}O_{12}$ | | | | | |
|---|---|---|---|---|---|
| a, b | α (Y) | β (Ce) | γ (Tb) | u (Ga) | v (Sc) |
| −0.01~0.20 | 0.033 | 0.001 | 0.05 | 0.393 | 0.006 |

As can be seen from the figure, when a<0 and b<0, vacancies are produced in sites of Ce and Tb, which are light-emitting ions, thereby capturing electrons produced by x-ray excitation, thereby lowering the light output. By setting $0 \leq a$ and $0 \leq b$, the vacancies are suppressed, thereby exhibiting a desirable light output. On the other hand, when a and b are both greater than 0.1, a perovskite phase $GdAlO_3$, different from the garnet type, is likely to be formed as an impurity phase in the scintillator. Since the impurity phase has a different refractive index than the garnet-type phase of the base metal, and therefore causes light scattering in the perovskite phase, thereby lowering the light output. In the range of and $0 \leq b \leq 0.1$, it is possible to prevent the lowering of the relative light output. An even higher light output is realized if $0 < a \leq 0.07$ and $0 < b \leq 0.07$, and an even higher light output is realized if $0.0001 \leq a \leq 0.05$ and $0.0001 \leq b \leq 0.05$.

Example 5

The relationship between the value α and the relative light output was examined for a case where Lu was used instead of Y, and a case where Y and Lu were both used.

Gadolinium oxide, yttrium oxide, lutetium oxide, terbium oxide, cerium nitrate, aluminum oxide, gallium oxide and scandium oxide were weighed to three different composition formulas shown in Table 6. These material powders were each put in a resin-made pot and subjected to wet ball mill using alumina balls for 40 hours, thereby producing a material slurry. The produced slurry was dried and then press-shaped into a flat-plate shape, which was sintered in oxygen. The sintering was performed by holding it at 1660° C. for 12 hours. The obtained fluorescent materials were subjected to an ICP-AES analysis for identifying the composition thereof, to find that they were fluorescent materials having the compositions shown in Table 6. The average crystal grain size was about 3 μm. Table 6 also shows the results for a sample using Y obtained in Example 1.

As can be seen from Table 6, it was confirmed that fluorescent materials according to the three different examples realize a high light output of 95% or more in terms of the relative light output, with 100% being that of $Gd_2O_2S$: Tb, as with fluorescent materials of other examples.

TABLE 6

Composition (atomic ratio) of $(Gd_{1-\alpha-\beta-\gamma}L_\alpha Ce_\beta Tb_\gamma)_{3+a}(Al_{1-u-v}Ga_u Sc_v)_{5-b}O_{12}$

| a, b | α (Y/Lu) | β (Ce) | γ (Tb) | u (Ga) | v (Sc) | Relative light output (%) |
|---|---|---|---|---|---|---|
| 0.01 | 0.033 (0/0.033) | 0.001 | 0.033 | 0.393 | 0.006 | 109 |
| 0.01 | 0.20 (0/0.20) | 0.001 | 0.033 | 0.393 | 0.006 | 103 |
| 0.01 | 0.20 (0.07/0.013) | 0.001 | 0.033 | 0.393 | 0.006 | 96 |
| 0.01 | 0.033 (0.033/0) | 0.001 | 0.033 | 0.393 | 0.006 | 109 |

Example 6

The relationship between the amount of Sc and the relative light output was examined. Gadolinium oxide, yttrium oxide, terbium oxide, cerium nitrate, aluminum oxide, gallium oxide and scandium oxide were weighed to a composition formula shown in Table 7. In the process, the amount v of Sc was varied between 0, 0.003, 0.006, 0.012, 0.020 and 0.025 in the composition formula below. These material powders were each put in a resin-made pot and subjected to wet ball mill using alumina balls for 40 hours, thereby producing a material slurry. The produced slurry was dried and then press-shaped into a flat-plate shape, which was sintered in oxygen. The sintering condition was such that it was performed by holding it at 1660° C. for 12 hours. Thus, fluorescent materials were obtained.

The obtained fluorescent materials were subjected to an ICP-AES analysis for identifying the composition thereof, to find that they were fluorescent materials having the composition shown in Table 7.

Figure 6:
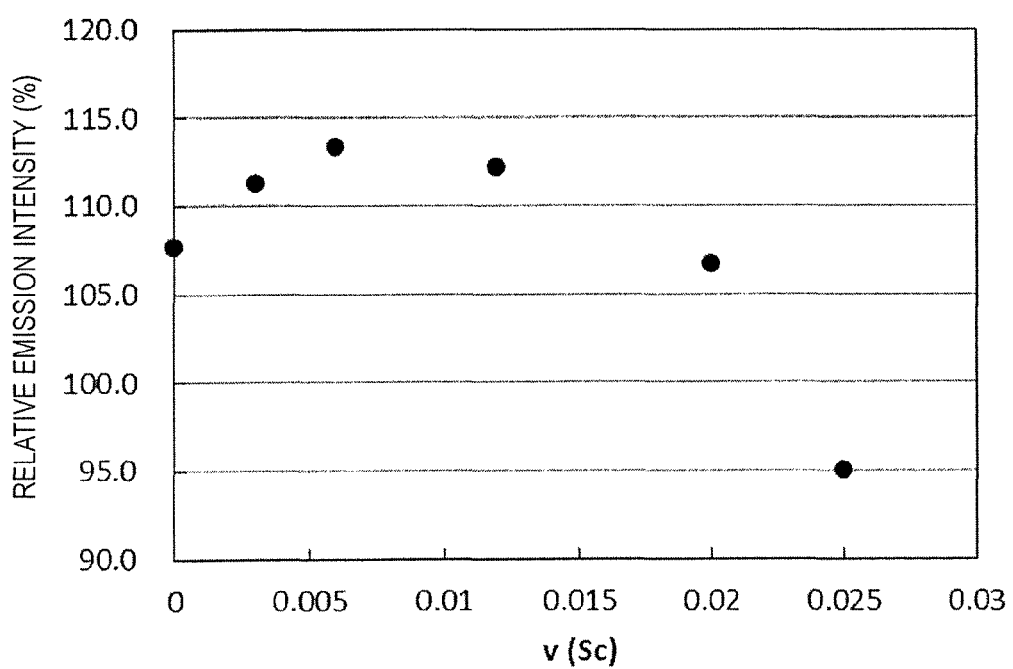
FIG. 6 A graph showing a relationship between the amount v of Sc and the relative light output.

The relationship between the amount v of Sc and the relative light output is shown in FIG. 6.

TABLE 7

Composition (atomic ratio) of $(Gd_{1-\alpha-\beta-\gamma}L_\alpha Ce_\beta Tb_\gamma)_{3+a}(Al_{1-u-v}Ga_u Sc_v)_{5-b}O_{12}$

| a, b | α (Y) | β (Ce) | γ (Tb) | u (Ga) | v (Sc) |
|---|---|---|---|---|---|
| 0.01 | 0.033 | 0.001 | 0.05 | 0.393 | 0~0.025 |

Figure 7:
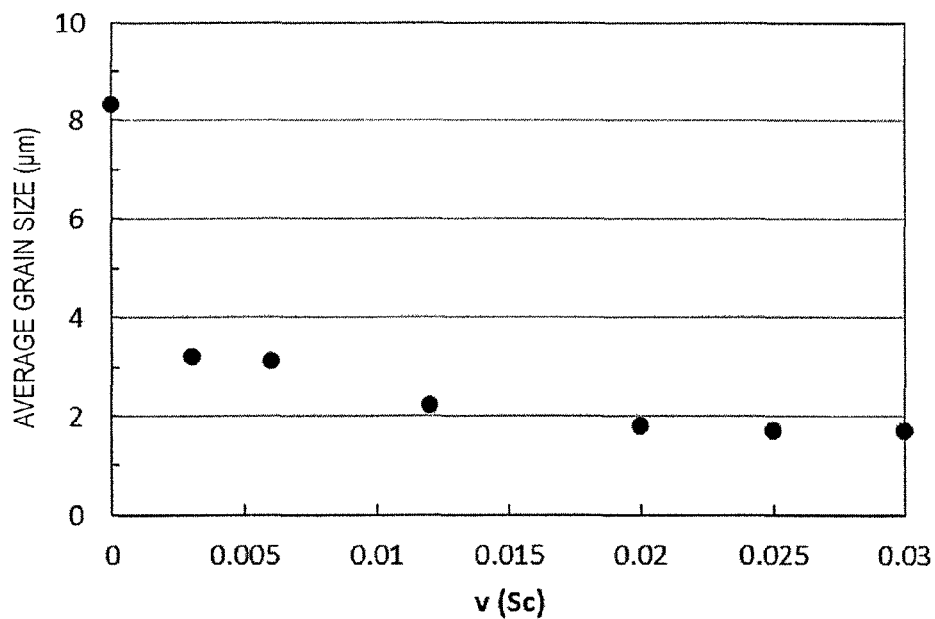
FIG. 7 A graph showing a relationship between the amount v of Sc and the average crystal grain size.

The relationship between the amount of Sc and the average crystal grain size of the fluorescent material was examined. The relationship between the amount of Sc and the average crystal grain size of the fluorescent material obtained above is shown in FIG. 7.

Table 8 shows the results of an examination on the amount of Sc, the average crystal grain size, the light output, and the toughness. As can be seen from FIG. 7 and Table 8, it is possible to prevent the lowering of the light output if the value v representing the amount of Sc is 0.02 or less. If v is set to 0.003 or more, the crystal grain growth is suppressed, and it is possible to realize a sufficiently small average crystal grain size. It is more preferred in view of toughness that the value of v is more is set to 0.010 or more. Materials of Sc are expensive, and adding large amounts thereof will therefore increase the cost. In view of this and of the effect of increasing the light output, the upper limit value of v is preferably 0.02, and more preferably 0.015.

TABLE 8

| Sample | v (Sc) | Average crystal grain size (μm) | Light output (%) | Toughness |
|---|---|---|---|---|
| Example 6-1 | 0 | 8.3 | 99 | Δ |
| Example 6-2 | 0.003 | 3.2 | 104 | ○ |
| Example 6-3 | 0.006 | 3.1 | 104 | ○ |
| Example 6-4 | 0.012 | 2.2 | 103 | ⊚ |
| Example 6-5 | 0.020 | 1.8 | 98 | ⊚ |
| Example 6-6 | 0.025 | 1.7 | 93 | ⊚ |
| Example 6-7 | 0.033 | 1.7 | 92 | ⊚ |

In Table 8, the toughness was evaluated by the 3-point bending test method in conformity with JIS-R-1601 after making a fibrous phosphor made of a fluorescent material of this composition. In the table, a triangle means the sample bent, a circle means the sample was somewhat difficult to bend, and a double circle means the sample was difficult to bend.

The fibrous phosphor was produced as follows. After obtaining the fluorescent material described above and pulverizing the fluorescent material into a powder having an average grain size of 100 nm, pure water, citric acid and polyvinylpyrrolidone were added to the pulverized powder, and the viscosity thereof was adjusted while heated. Then, the obtained fluorescent material was dry-spun using a dry spinning apparatus into a fibrous form. The obtained fiber was degreased in the atmospheric air at a temperature-increasing rate of 100° C./h, at 900° C., for one hour, and then sintered by being held in oxygen at 1550° C. for 10 minutes, thus obtaining the fibrous phosphor. The average fiber diameter of the obtained fibrous phosphor is 10 μm. It was confirmed that a fibrous phosphor with Sc added thereto had an improved toughness, and thus a higher bending resistance, as compared with fibrous phosphor with no Sc added thereto. Note however that even if no Sc is added, the material is an effective fluorescent material, and can be used as a powder phosphor or a sheet phosphor, for example.

Example 7

Fibrous phosphors were manufactured by using the fluorescent material of the present invention, and a scintillator was manufactured in which the fibrous phosphors disposed in parallel to one another.

The fibrous phosphors used were manufactured by the slurry method.

2.57 g of $Y_2O_3$, 113.72 g of $Gd_2O_3$, 0.196 g of $CeO_2$, 6.39 g of $Tb_4O_7$, 34.83 g of $Al_2O_3$, 41.83 g of $Ga_2O_3$, and 0.471 g of $Sc_2O_3$ were weighed to the $Gd_{2.755}Y_{0.1}Tb_{0.15}Ce_{0.005}Al_{3.00}Ga_{1.96}Sc_{0.03}O_{12}$ composition, and these raw materials were put into a resin-made pot whose capacity is one liter, together with 1300 g of 5-mm-diameter high-purity alumina balls and 200 cc of ethanol, and mixed together for 20 hours. Then, the mixture was dried and sintered in the atmospheric air at 1400° C. for two hours. The sintered powder was subjected to bead milling using 0.1-mm-diameter alumina beads, thereby obtaining a pulverized powder having an average grain size of 100 nm. Pure water, citric acid and polyvinylpyrrolidone were added to this powder, and the viscosity thereof was adjusted while being heated.

Then, the obtained fluorescent material was dry-spun using a dry spinning apparatus into different types of fibrous phosphors whose diameters are about 1 to 50 µm. The obtained fiber was degreased in the atmospheric air at a temperature-increasing rate of 100° C./h, at 900° C., for one hour, and then sintered by being held in oxygen at 1550° C. for 10 minutes, thus obtaining the fibrous phosphor. The average fiber diameter of the fibrous phosphor was 1 to 50 µm.

There were provided a plurality of threads of the fibrous phosphor with the outer surface thereof coated with a thermosetting resin (epoxy resin). These fibrous phosphors were disposed in parallel to one another inside a cylindrical pressure chamber so that the longitudinal direction of the fibrous phosphors was along the axial direction of the chamber. Then, the opposite openings in the axial direction of the cylindrical chamber were covered with lids and sealed. Then, the cylindrical chamber was pressurized so that the pressure was applied equally in the radial direction of the cylindrical chamber. The pressure was between 10 MPa and 300 MPa. The individual fibrous phosphors were pressurized only in the direction perpendicular to the longitudinal direction so as to fill the gap between the fibrous phosphors with a thermosetting resin. The excess resin was allowed to be discharged to the outside through holes in the lid.

Then, the bundle of resin-filled fibrous phosphors was taken out of the pressure chamber, and heated to completely cure the resin, thereby obtaining the shaped material. Then, the shaped material was cut into a plate-shaped scintillator.

The fibrous phosphor filling rate in the scintillator was 80%. An light output measurement similar to that of Examples 1 to 6 showed a relative light output of about 90%.

Figure 8:
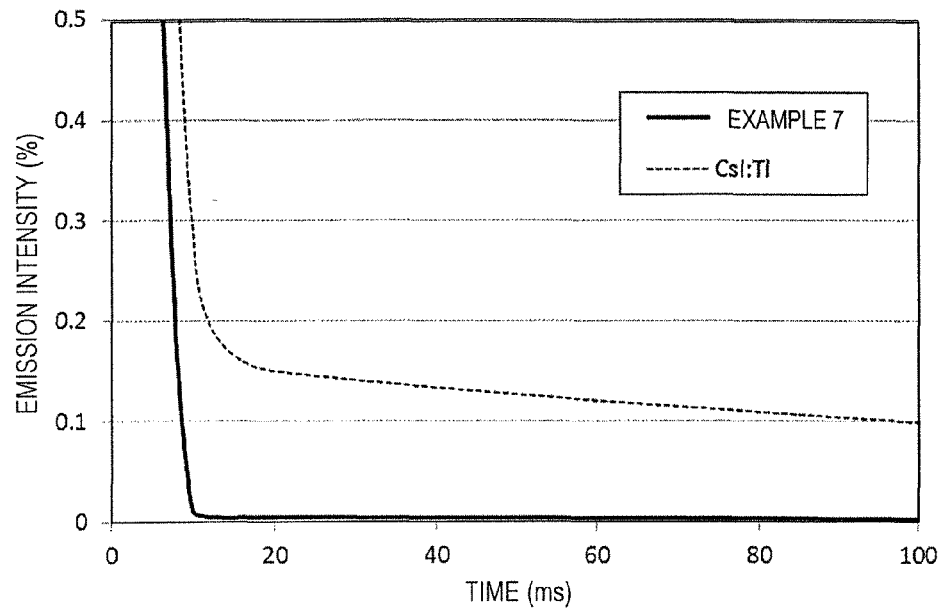
FIG. 8 A graph showing a relationship between the amount of time after X-ray irradiation and the afterglow.

FIG. 8 shows the results of an examination on the afterglow characteristics performed by irradiating the produced scintillator with X rays. For the purpose of comparison, it also shows the afterglow characteristics of a scintillator produced by using a fluorescent material made of CsI with Tl added thereto. As can be seen from FIG. 8, it was found that the light output of the scintillator of this example substantially becomes zero in about 10 ms after the X ray irradiation. When recording a movie with X rays, the frame rate is 30 fps (frames/s), and one frame period is 33 ms. Therefore, the afterglow of the scintillator of this example is sufficiently short as compared with one frame period, and it is therefore believed that the afterimage will not substantially be an issue when recording a movie using the scintillator of this example.

In contrast, with a scintillator produced by using a fluorescent material made of CsI, an afterglow of about 10% of the maximum light output lasts for as long as 100 ms or more, and the afterglow will therefore be conspicuous when recording a movie with X rays. Thus, it was found that a scintillator using the fluorescent material of this example can suitably be used for recording a movie with X rays, for example.

Next, the five sides of the scintillator, excluding the photodetector side, was coated with a light-reflecting material obtained by mixing a $TiO_2$ powder with an epoxy resin. This plate-shaped scintillator was irradiated with X rays (W target; tube voltage: 120 kV, tube current: 20 mA), and the light output was measured by using a silicon photodiode, confirming that it had a sufficient light output.

REFERENCE SIGNS LIST

1 Scintillator
2 Photoelectric converter
3 Fibrous phosphor
4 Binder resin
10 Radiation image conversion panel

The invention claimed is:

1. A fluorescent material having a composition formula represented as $(Gd_{1-\alpha-\beta-\gamma}L_\alpha Ce_\beta Tb_\gamma)_{3+a}(Al_{1-u-v}Ga_u Sc_v)_{5-b}O_{12}$ (L is at least one element selected from Y and Lu), where a, b, α, β, γ, u and v satisfy the following ranges:
    wherein a, b, α, β, γ, u and v satisfy the following ranges:
    0<a≤0.07,
    0<b≤0.07,
    0<α≤0.15,
    0.0003≤β≤0.004,
    0.03≤γ≤0.15,
    0.35≤u≤0.70, and
    0≤v≤0.02.

2. The fluorescent material of claim 1, wherein β satisfies the following range:
    0.0005≤β≤0.003.

3. The fluorescent material of claim 1, wherein v satisfies the following range:
    0.003≤v≤0.02.

4. The fluorescent material of claim 1, wherein a=b.

5. The fluorescent material of claim 1, wherein the fluorescent material is a polycrystalline material, and an average crystal grain size of the sintered material is 0.05 µm or more and 5 µm or less.

6. The fluorescent material of claim 1, wherein the fluorescent material is in the form of a plurality of fibers, the average fiber diameter is 1 µm or more and 50 µm or less.

7. A scintillator including fluorescent material of claim 6 and having a plate shape, wherein the fluorescent materials are disposed in parallel to one another so that a longitudinal direction of a fibrous shape of the fluorescent materials is along a thickness direction of the plate shape.

8. A radiation image conversion panel comprising:
    a scintillator of claim 7; and
    a photoelectric converter for converting light into an electrical signal.

* * * * *